(12) United States Patent
Taylor

(10) Patent No.: US 8,512,866 B2
(45) Date of Patent: Aug. 20, 2013

(54) FLEXIBLE SOLAR PANEL WITH A MULTILAYER FILM

(75) Inventor: Thomas J. Taylor, Wayne, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

(21) Appl. No.: 12/917,462

(22) Filed: Nov. 1, 2010

(65) Prior Publication Data

US 2011/0185651 A1    Aug. 4, 2011

Related U.S. Application Data

(60) Provisional application No. 61/256,812, filed on Oct. 30, 2009.

(51) Int. Cl.
*B23B 27/00* (2006.01)

(52) U.S. Cl.
USPC .......... 428/421; 428/346; 428/517; 52/173.3; 136/251

(58) Field of Classification Search
USPC ........ 52/173.3; 136/251, 243, 244; 428/451, 428/421, 346, 517; 156/71
See application file for complete search history.

(56) References Cited

U.S. PATENT DOCUMENTS

| | | | | |
|---|---|---|---|---|
| 4,888,061 A | * | 12/1989 | Wenz | 136/251 |
| 4,968,372 A | * | 11/1990 | Maass | 156/249 |
| 5,650,019 A | * | 7/1997 | Yamada et al. | 136/251 |
| 5,962,108 A | | 10/1999 | Nestegard et al. | |
| 6,107,213 A | * | 8/2000 | Tayanaka | 438/762 |
| 6,426,274 B1 | * | 7/2002 | Tayanaka | 438/458 |
| 2002/0050287 A1 | * | 5/2002 | Yamada et al. | 136/251 |
| 2006/0057392 A1 | * | 3/2006 | Smillie et al. | 428/421 |
| 2006/0166023 A1 | * | 7/2006 | Yoshikata et al. | 428/523 |
| 2007/0166562 A1 | * | 7/2007 | Swei et al. | 428/500 |
| 2007/0193624 A1 | * | 8/2007 | Krasnov | 136/258 |
| 2008/0029210 A1 | * | 2/2008 | Swei et al. | 156/272.2 |
| 2008/0245399 A1 | * | 10/2008 | DeLiddo | 136/244 |

FOREIGN PATENT DOCUMENTS

JP    2007208213 A  *  8/2007

OTHER PUBLICATIONS

Written Opinion and Search Report of corresponding PCT/US10/55024 mailed Jan. 24, 2012.

* cited by examiner

*Primary Examiner* — Robert Canfield
*Assistant Examiner* — Babajide Demuren
(74) *Attorney, Agent, or Firm* — Baker & McKenzie LLP

(57) ABSTRACT

Multilayer films of the present disclosure may be connected to a photovoltaic component and laminated to a building surface. The multilayer film may include a compatibilizing layer made of a first material and a barrier layer made of second material and connected to a first external surface of the compatibilizing layer. In an embodiment, the first material, the second material, and the building material may all be different materials. The multilayer film may further include an adhesive layer for bonding with the building surface, and the compatibilizing layer may be disposed between the adhesive layer and the barrier layer.

16 Claims, 1 Drawing Sheet

FLEXIBLE SOLAR PANEL WITH A MULTILAYER FILM

CROSS REFERENCE TO RELATED APPLICATION

This application claims priority to U.S. Prov. Patent Application Ser. No. 61/256,812, filed Oct. 30, 2009, entitled "Improved back sheet for flexible solar panel," the entirety of which is incorporated herein by reference. It should be noted that this application is being filed on Monday, Nov. 1, 2010, which is the first business day following the one year anniversary of Oct. 30, 2009, pursuant to MPEP §710.05.

TECHNICAL FIELD

The present disclosure generally relates to multilayer films for flexible solar panels, and more particularly to multilayer films that connect photovoltaic panels to a building surface.

BACKGROUND

There is an increasing interest in building integrated photovoltaic systems (BIPV). In one type of BIPV, flexible solar panels are adhered directly onto the exterior of building surfaces. The exterior building surface may be a thermoplastic olefin (TPO) membrane. The only commercial flexible solar panels that are readily available in significant volumes are from UniSolar. However, other similar panels are becoming more readily available from other manufacturers, such as Ascent Solar and Fuji Electric Systems.

SUMMARY

Disclosed includes one exemplary embodiment of a multilayer film in accordance with the present disclosure is operable to be connected to a photovoltaic component and laminated a building surface, the building surface being made of a building material. The multilayer film comprises a compatibilizing layer made of a first material and a barrier layer connected to a first external surface of the compatibilizing layer, the barrier layer being made of second material. The first material, the second material, and the building material are all different materials.

In an embodiment, the multilayer film further comprises an adhesive layer connected to a second external surface of the compatibilizing layer, the adhesive layer comprising a first adhesive, and the barrier layer is laminated to the compatibilizing layer by a second adhesive formulated differently from the first adhesive.

In another embodiment, the compatibilizing layer comprises a plurality of sub-layers. The plurality of sub-layers may each be made of different materials. In some embodiment, the sub-layers may be laminated to each other with adhesives, and the adhesive between the sub-layers may be each formulated differently.

Also disclosed includes one exemplary embodiment of a solar panel operable to be laminated to a building surface, the building surface being made of a building material. The solar panel may comprises a photovoltaic component and a multilayer film comprising a compatibilizing layer made of a first material and a barrier layer connected to a first external surface of the compatibilizing layer, the barrier layer being made of second material and disposed between the photovoltaic component and the compatibilizing layer. The first material, the second material, and the building material are all different materials.

Also disclosed includes one exemplary embodiment of a method of assembling a solar panel operable to be laminated to a building surface, the building surface being made of a building material. The method comprising: providing a photovoltaic component; forming a multilayer film by: 1) preparing a compatibilizing layer made of a first material; 2) preparing a barrier layer made of a second material; and laminating the compatibilizing layer to the barrier layer; and connecting the photovoltaic component to the multilayer film, wherein the barrier layer is disposed between the photovoltaic component and the compatibilizing layer. The first material, the second material, and the building material are all different materials.

In an exemplary embodiment, the barrier layer is disposed over a first external surface of the compatibilizing layer, and the method further comprises applying an adhesive layer on a second external surface of the compatibilizing layer, the adhesive layer comprising a first adhesive, wherein the barrier layer is laminated to the compatibilizing layer by a second adhesive formulated differently from the first adhesive.

In another exemplary embodiment, preparing the compatibilizing layer further comprises laminating a plurality of sub-layers with adhesives, wherein the sub-layers are each made of different materials, and the adhesives between the sub-layers are each formulated differently.

DETAILED DESCRIPTION

Figure 1:
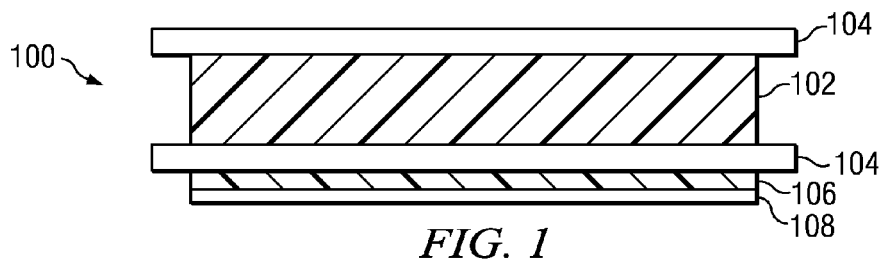
FIG. 1 is a cross-sectional view of a conventional flexible solar panel.

FIG. 1 is schematic diagram showing a cross-sectional view of a conventional flexible solar panel 100. The active components 102 of the panel 100 are laminated between sheets of polymers 104, which have low diffusion rates for moisture and air. Such polymer sheets 104 may be made from ethylene-tetrafluoroethylene copolymers (ETFE or poly ETFE). An example is the polyvinyl fluoride films marketed by DuPont.

For adhesion to building surfaces, the flexible solar panel 100 may include a butyl-type adhesive 106 applied to a back-surface of the panel 100 and a release liner 108 covering the adhesive 106. Once the release liner 108 is removed, the panel 100 can be stuck down onto a building surface (not shown), such as a TPO roofing membrane. There are several problems with this approach, which are discussed below.

Initially, one disadvantage is that some adhesives may not adhere readily to ETFE-type polymers. Therefore, resulting peel strengths may be very low. Very soft and tacky versions of butyl adhesives may be used to achieve adhesion to the ETFE surfaces. But the softness of the adhesives may cause the adhered surfaces to be pulled apart even with very low force applied. Another disadvantage is that soft and tacky adhesives give rise to creep issues. This is particularly the case in high-temperature locals. In addition, thermal expansion and contraction of the structure on which the solar cell is adhered, and/or the adhesive itself, can cause the ETFE surface to delaminate from the adhesive. In the face of these disadvantages, there is a need for a technique and resulting product providing for improved adhesion of flexible solar panels to TPO membranes.

Figure 2:
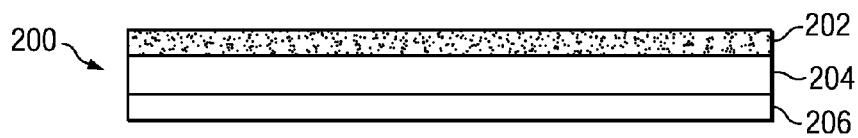
FIG. 2 is a cross-sectional view of an exemplary embodiment of a multilayer film in accordance with the principles disclosed herein.

FIG. 2 is a schematic diagram showing a cross-sectional view of a multilayer film 200 constructed in accordance with the principles disclosed herein. The multiplayer film 200 may replace the ETFE backfilm 104 in the solar panel 100 shown in FIG. 1. The multilayer film 200 may include a barrier layer 202 comprising an ETFE material or some other suitable barrier material on a first side of the film 200. The barrier layer 202 may be joined to the underside of a flexible solar cell (e.g., active components 102 in FIG. 1).

The multilayer film 200 may include a compatibilizing layer 204 connected to the barrier layer 202. The compatibilizing layer 204 may be made of a material that is different from the material in the barrier layer 202 and operable to provide an improved adhesion surface for receiving an adhesive formulated to bond with a building surface (not shown). In some embodiments, the adhesive is included in an outer adhesive layer 206 disposed on the improved adhesion surface provided by the compatibilizing layer 204. As such, the film 200 includes a compatibilizing layer 204 sandwiched between the barrier layer 202 and the adhesive layer 206. In an embodiment, the adhesive layer 206 comprises a polyolefin melt adhesive.

The choice of material for the compatibility layer 204 may be determined in view of the adhesion properties of a building surface, such as a TPO membrane. The compatibility layer 204 may be of a material with adhesion properties similar to the building surface such that the adhesive layer 206 may form strong bonds with both the surface of the compatibility layer 204 and the building surface. It is to be appreciated that instead of applying adhesives directly on the barrier layer 202 for lamination onto the building surface, the compatibilizing layer 204 of the multilayer film 200 bridges the differences in the adhesion properties of the barrier layer 202 and the building surface and provides two interfaces with high-strength bonds therebetween. At a first interface, high-strength bonds may be formed between the compatibilizing layer 204 and the barrier layer 202. At a second interface, adhesive layer 206 may form high-strength bonds with the compatibilizing layer 204 and the building surface. As such, the compatibilizing layer 204 eliminates an otherwise weak interface between the barrier layer 202 and the building surface and allows the multilayer film 200 have one side operable to function as a barrier layer for solar cells and another side operable to allow strong adhesion to building surfaces.

Accordingly, in an embodiment wherein the barrier layer 202 comprises an ETFE-type polymer, the problem associated with weak adhesion between adhesives and ETFE-type polymers may be overcome. Also, the soft, tacky versions of butyl adhesives discussed above that typically give way to creepage issues may be replaced by a more robust adhesive to adhere a solar panel to a TPO membrane, or even directly to a roofing deck. For example, harder versions of butyl may be used as the adhesive, such as Alfa's 246 and Functional Coating's 6016, which have been shown to adhere particularly well to TPO materials. In either embodiment, the adhesion of the solar cell to a roofing deck or TPO surface can be drastically improved, without the delamination, creepage and other disadvantages associated with conventional approaches to flexible solar panels adhered to a roof, wall or other desirable surface.

To ensure the structural integrity of the multilayer film 200, the compatibilizing layer 204 may also have adhesion properties similar to those of the barrier layer 202 to allow an adhesive to form high-strength bonds between the barrier layer 202 and the compatibilizing layer 204. In an embodiment in which the barrier layer 202 and the building surface have very different adhesion properties, the adhesive for laminating the barrier layer 202 and the compatibilizing layer 204 may be different from the adhesive in the adhesive layer 206. While the barrier layer 202 and the compatibilizing layer 204 may be connected using an adhesive, it is to be appreciated that these two layers may be connected with any connection means known in the art, including but not limited to suitable mechanical means or chemical means, depending design parameters related to product performance or manufacturing efficiency. In some embodiments, it may be advantageous to use mechanical means to connect materials with drastically different adhesion properties. In some embodiment, chemical lamination may provide a particularly durable connection between the barrier layer 202 and the compatibilizing layer 204.

The compatibilizing layer 204 may be made of a variety of materials that would bridge the differences in the adhesion properties of the barrier layer 202 and the building surface. An exemplary compatibilizing layer 204 may include materials described in U.S. Patent Application Publication No. 2007/0166562A1 and U.S. Patent Application Publication NO. 2009/0162652A1, both of which are incorporated by reference herein. In an embodiment, the compatibilizing layer 206 may include a blend of fluoropolymer with another polymer, such as an acrylic. In another embodiment, the compatibilizing layer 204 may comprise a polycarbonate or a polyester and an acrylic or methacrylic compatabilizer. In an embodiment, the barrier layer 202 may comprise a ETFE-type polymer, and a suitable type of adhesive such acrylic, anaerobic, cyanoacrylate, epoxy, hot melt, silicone, urethane may be used to bond the barrier layer 202 to the compatibilizing layer 204. In an embodiment, a suitable adhesive may include Black Max 380, Prism 401, Prism Primer 770, Super Bonder 414, Depend 330, Loctite 315, or any combination thereof.

Figure 3:
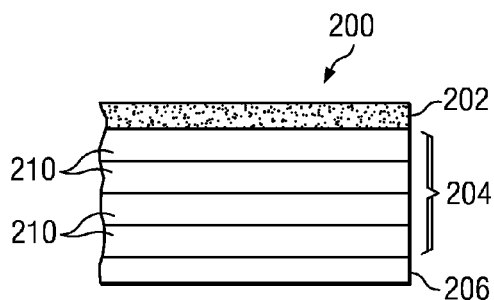
FIG. 3 is a cross-sectional view of an exemplary embodiment of the multilayer film shown in FIG. 2.
Figure 4:
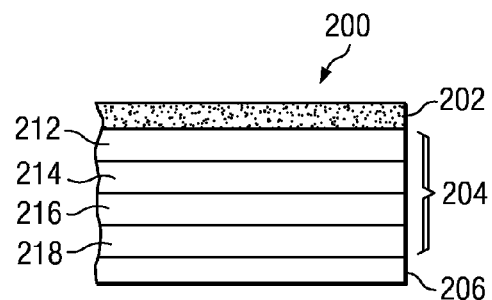
FIG. 4 is a cross-sectional view of another exemplary embodiment of the multilayer film shown in FIG. 2.

In an embodiment, the compatible layer 204 in FIG. 2 may include a plurality of sub-layers as shown in FIGS. 3 and 4. In the embodiment shown in FIG. 3, each sub-layer 210 may be made of the same material. In another embodiment, the sub-layers 210 may include at least two sub-layers made of different materials. In the embodiment shown in FIG. 4, the sub-layers 212-218 may be formulated such that a gradient in adhesion properties is provided within the compatibilizing layer 204. For example, the compatible layer 204 may include a first sub-layer 212 with adhesion properties substantially similar to those of the barrier layer 202. The adhesion property of the other sub-layers 214-218 may be formulated such that each subsequent sub-layer exhibits adhesion properties closer to a building surface. In an embodiment, the barrier layer 202 may be an ETFE-type polymer and the building surface may be a TPO membrane. In an exemplary embodiment, the sub-layer 212 may have adhesion properties substantially similar to those of an ETFE-type polymer, and the sub-layer 218 may have adhesion properties substantially similar to those of a TPO membrane. The sub-layers 212-218 may be laminated together using the same adhesive. In an embodiment, a different adhesive between each interface between the sub-layers 212-218 may be used. While the embodiment in FIG. 4 is shown to include four sub-layers 212-218, it is to be appreciated that the compatibilizing layer 214 may include different numbers of sub-layers, such as 2, 3, or more than 4, depending on performance requirements.

Figure 5:
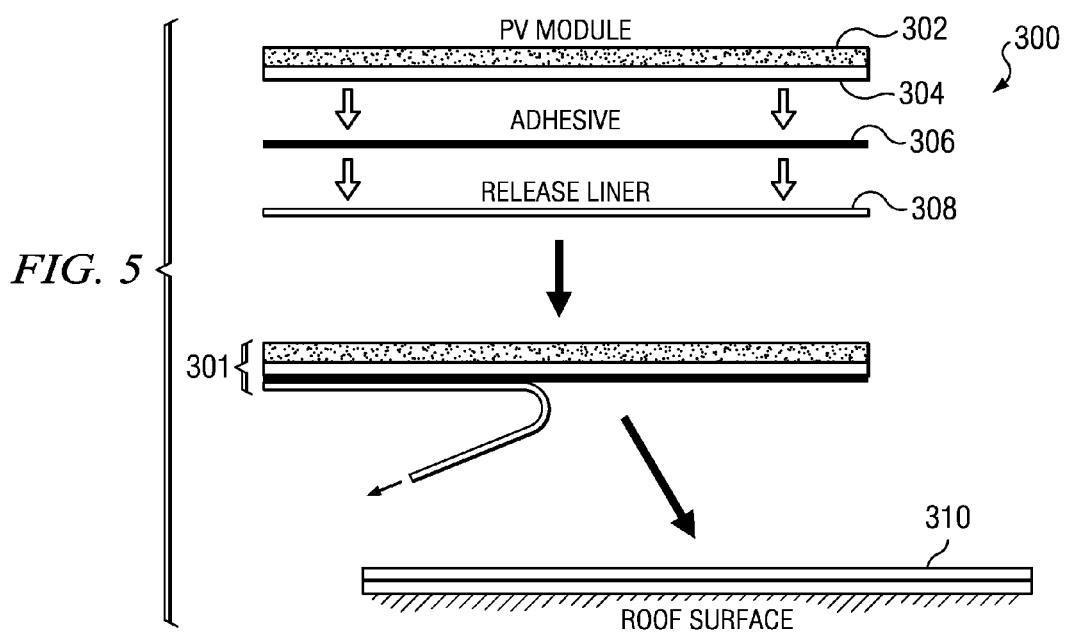
FIG. 5 is a cross-sectional view of an exemplary embodiment of a solar panel system in accordance with the principles disclosed herein.

FIG. 5 is a schematic diagram showing a cross-sectional, partially-exploded view of a flexible solar panel system 300 constructed in accordance with the principles disclosed herein. The solar panel system may include a solar panel 301, which may include a photovoltaic module ("PV module") 302 laminated to a first side of a multilayer film 304. The multilayer film 304 may be configured according to any exemplary multilayer film disclosed herein. In an embodiment, the multilayer film 304 includes a barrier layer (not shown) and a compatibilizing layer (not shown), which may in turn include a plurality of sub-layers. The multilayer film 304 may further include an optional adhesive layer 306 on a second side of the film 304. The solar panel 300 may further include a release liner 308 covering the adhesive layer 306 for easy storage and transportation before installation of the panel 300. To construct the solar panel system 200, the release line 308 may be removed to allow the adhesive layer 306 to bond the solar panel 301 to the building surface 310. In another embodiment, the adhesive layer 306 is not included, and the multilayer film 304 may be laminated directly to a building surface 310 with heat and pressure, such as a TPO roofing membrane. A PV module 302 without any backsheet could then be laminated directly to the top layer of multilayer film 304, which has been laminated to the building surface 310.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A multilayer film operable to be connected to a photovoltaic component and laminated to a building surface with an adhesive layer, the multilayer film comprising:
   a compatibilizing layer comprising a plurality of sub-layers, the sub-layers formulated such that a gradient in adhesion properties is provided;
   a barrier layer connected to a first surface of the compatibilizing layer; and
   an adhesive layer connected to a second surface of the compatibilizing layer, the adhesive layer comprising a first adhesive;
   wherein the first surface of the compatibilizing layer forms a first high-strength adhesive interface with the barrier layer and the second surface of the compatibilizing layer forms a second high-strength adhesive interface with the adhesive layer, thereby eliminating a weaker interface that would otherwise form between the barrier layer and the adhesive layer.

2. The multilayer film of claim 1, wherein the barrier layer is laminated to the compatibilizing layer by a second adhesive formulated differently from the first adhesive.

3. The multilayer film of claim 2, wherein the barrier layer is an ethylene-tetrafluoroethylene copolymers.

4. The multilayer film of claim 1, wherein at least two of the sub-layers are made of different materials.

5. The multilayer film of claim 4, wherein the sub-layers are each made of different materials.

6. The multilayer film of claim 5, wherein the sub-layers are laminated to each other with adhesives, and the adhesives between the sub-layers are each formulated differently.

7. The multilayer film of claim 1, wherein the compatibilizing layer is chemically welded to the barrier layer with a chemical solvent.

8. A solar panel operable to be laminated to a building surface with an adhesive layer, the solar panel comprising:
   a photovoltaic component; and
   a multilayer film comprising:
     a compatibilizing layer comprising a plurality of sub-layers, the sub-layers formulated such that a gradient in adhesion properties is provided;
     a barrier layer connected to a first surface of the compatibilizing layer, the barrier layer being disposed between the photovoltaic component and the compatibilizing layer; and
     an adhesive layer connected to a second surface of the compatibilizing later, the adhesive layer comprising a first adhesive;
     wherein the first surface of the compatibilizing layer forms a first high-strength adhesive interface with the barrier layer and the second surface of the compatibilizing layer forms a second high-strength adhesive interface with the adhesive layer, thereby eliminating a weaker interface that would otherwise form between the barrier layer and the adhesive layer.

9. The solar panel of claim 8, wherein the multilayer film further comprises an adhesive layer connected to a second external surface of the compatibilizing layer, the adhesive layer comprising a first adhesive, wherein the barrier layer is laminated to the compatibilizing layer by a second adhesive formulated differently from the first adhesive.

10. The solar panel of claim 9, wherein the barrier layer is an ethylene-tetrafluoroethylene copolymers.

11. The solar panel of claim 8, wherein at least two of the sub-layers are made of different materials.

12. The solar panel of claim 11, wherein the sub-layers are each made of different materials.

13. The solar panel of claim 12, wherein the sub-layers are laminated to each other with adhesives, and the adhesives between the sub-layers are each formulated differently.

14. A method of assembling a solar panel operable to be laminated to a building surface with an adhesive layer, the method comprising:
   providing a photovoltaic component;
   forming a multilayer film by:
     providing a compatibilizing layer comprising a plurality of sub-layers, the sub-layers formulated such that a gradient in adhesion properties is provided;
     providing a barrier layer;
     providing an adhesive layer made of a first adhesive;

laminating a first surface of the compatibilizing layer to the barrier layer; and laminating a second surface of the compatibilizing layer to the adhesive layer;

connecting the photovoltaic component to the multi-layer film, wherein the barrier layer is disposed between the photovoltaic component and the compatibilizing layer;

wherein the first surface of the compatibilizing layer forms a first high-strength adhesive interface with the barrier layer and the second surface of the compatibilizing layer forms a second high-strength adhesive interface with the adhesive layer, thereby eliminating a weaker interface that would otherwise form between the barrier layer and the adhesive layer.

15. The method of claim 14, wherein the barrier layer is laminated to the compatibilizing layer by a second adhesive formulated differently from the first adhesive.

16. The method of claim 14, wherein providing the compatibilizing layer further comprises laminating the plurality of sub-layers with adhesives, wherein the sub-layers are each made of different materials, and the adhesives between the sub-layers are each formulated differently.

* * * * *